Nov. 9, 1948.   E. GORDON   2,453,428
PIPE JOINT

Filed June 18, 1945   3 Sheets-Sheet 1

INVENTOR:
Ernest Gordon
By Attorney: Walter Gunn

Nov. 9, 1948. E. GORDON 2,453,428
PIPE JOINT
Filed June 18, 1945  3 Sheets-Sheet 2

INVENTOR:
Ernest Gordon
By Attorney: Walter Gunn

Nov. 9, 1948.  E. GORDON  2,453,428
PIPE JOINT

Filed June 18, 1945  3 Sheets—Sheet 3

INVENTOR:
Ernest Gordon.
By Attorney: Walter Gunn

Patented Nov. 9, 1948

2,453,428

UNITED STATES PATENT OFFICE 2,453,428

PIPE JOINT

Ernest Gordon, Prestwich, England, assignor of one-half to Arthur Ernest Roberts, Prestwich, England Application June 18, 1945, Serial No. 600,095
In Great Britain March 28, 1944

Section 1, Public Law 690, August 8, 1946
Patent expires March 28, 1964

4 Claims. (Cl. 285—10)

The bearings known as doll-heads are used inter alia for the support of drying cylinders, hot calender rolls and like rotating members into which steam is to be fed at one end from a stationary (non-rotary) pipe, and from which steam and condensate (if any) are to be withdrawn at the other end to a further stationary pipe. The said pipes extend to points in planes above or below the axis of rotation and lie in directions at right angles (or substantially so) to said axis. The difficulty encountered in using these bearings is that, for the reasons set out below, steam and water leak at the joints between the rotating and stationary parts, often to a serious extent. It is conceivable that the invention may find other uses than with steam, but it will be described merely as applied to a bearing for rotary steam-heated apparatus.

Many proposals have been made hitherto for the overcoming of the above named difficulty, but not with permanent success. The said difficulty arises from several causes, notably the axial expansion and contraction of the cylinder or roller due to temperature changes, which varies the position of the said joints along the axis of rotation; the axial expansion and contraction of the stationary pipes also due to temperature changes, and which tends to displace the axis of the stationary part of the joint out of line with that of the rotating part; and the normal wear and tear due to friction between relatively rotating parts.

The pipes leading directly to and from the doll-heads are usually branch pipes arranged at right angles to the axis of rotation (or substantially so) in plan, and grow out of rigid main pipes or trunks. The axial displacement of the bearing along the axis of rotation, calls for flexibility in the branch pipe, and this has usually been provided by the use of resilient asbestos or like packings in joints between fixed and movable parts of the branch pipe, but, as the steam very soon deprives those packings of their resilience, the joints cease to be steam tight. The trouble is sometimes aggravated in that the packings shrink, allowing the steam to get past and underneath them, and they also become hard, and act as pistons tending to open the joints instead of serving to close the joints. The desired flexibility in the branch pipes cannot be provided by the use of flexible hose, as that material would not stand up for a sufficient length of time to the adverse effects of hot steam; nor yet by the use of flexible metal tubing, such as copper tubing, as that material would not withstand the blows and pressures to which it would be subjected from day to day as the operator works about and on the machine, e. g. in cleaning, threading up, repairing and the like.

With doll-head bearings as hitherto known, a bank of drying cylinders, or hot calenders, is almost always shrouded in clouds of escaping steam, and especially on the water side, is attended by dripping bearings and pools of water on the floor. This loss of steam represents a considerable wastage of fuel; the frequent renewal of resilient packings is a great expense; and it is not uncommon for the bearings of the lower rows of cylinders to require mackintosh covers or the like to protect them from drippings from the bearings of the upper rows.

The present invention has for its object the provision of doll-head bearings which are free from the defects named above; which take adequate care of expansion and contraction in the cylinders or rollers and in the branch pipes; which require no resilient or other perishable packings, and which are self-lubricating at the friction surfaces between the relatively rotating parts.

According to this invention, in an arrangement in which a branch pipe provides communication between a statioary main pipe and the rotating trunnion, three pressure-closed ball-and-socket joints are provided, arranged at the three corners of a triangle, one joint being at the connection of the branch pipe with the main pipe, another being at the connection of the branch pipe with the trunnion, and the third being between components of the branch pipe itself lying at an angle to each other. Consequently, as any one side of the triangle varies its length, due to expansion or contraction of the relevant parts, the others may vary their relative angular dispositions, to accommodate such change of length and thereby keep the several joints closed. This will be more clear from the ensuing description which refers to the accompanying drawings. Since the joints are of ball-and-socket type, they continue to function as joints despite changes in the angle between the axes of the jointed parts.

Preferably the joint between components of the branch pipe itself will be close to the joint at the trunnion and, with the parts cold, will also be on the axis of the trunnion.

A convenient embodiment of the invention has a ball-and-socket joint at the end of the cylinder trunnion, both the parts of which rotate together and therefore do not require lubrication; a second ball-and-socket in line therewith, the parts of which have relative rotation and are lubricated, the two sockets being in opposite ends of the same member (which is a component of the branch pipe), and both balls being held in their sockets by the same spring means; and a third ball-and-socket member at the connection with the main pipe, with spring closing means, neither part of which has rotation. The supporting bearing for the trunnion is such as to allow of the to-and-from axial movement of the trunnion as the cylinder expands and contracts.

Figure 1:
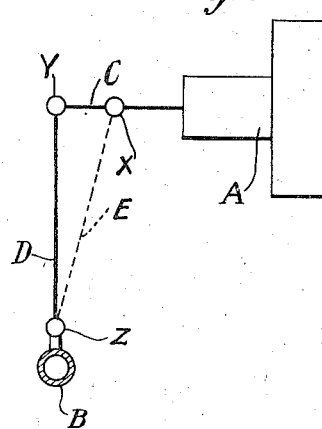
Figs. 1, 2 and 3 are diagrams illustrating the functioning of the preferred form of the invention.
Figure 2:
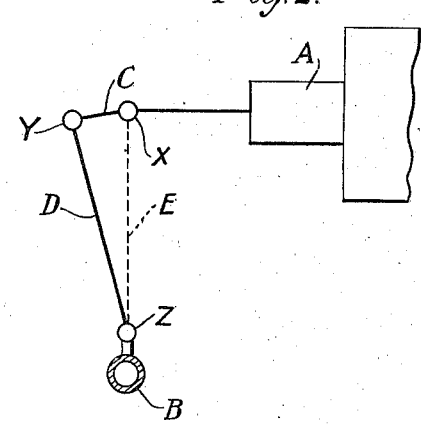
Figure 3:
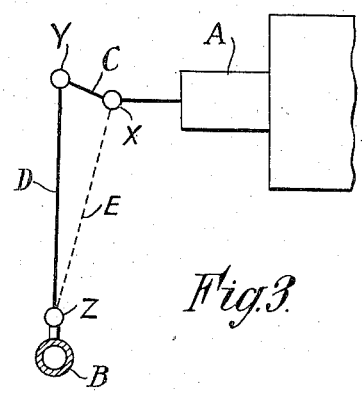

Referring first to Figs. 1, 2 and 3, A is the cylinder trunnion and B is the main supply or return pipe. Between these is the two-part branch pipe, having components C and D, and these several parts are connected together by pressure-closed, ball-and-socket joints X, Y, Z. In Fig. 1 the parts are shown in the normal cold position, both joints X and Y being on the axis of cylinder A. Should the cylinder expand, and displace those joints axially, the components C, D vary their relative angular disposition as shown in Fig. 2, all the joints remaining closed, due to the applied pressure. Should component D expand, and displace the joint Y vertically, a similar accommodation takes place. In practice, the parts A, C and D will all be subject to expansion and contraction, but their mutual variations are compensated by the flexibility at joint Y, and by the fact that the total length of the components C and D is substantially greater than the third side of the triangle represented by the dotted line E.

Figure 4:
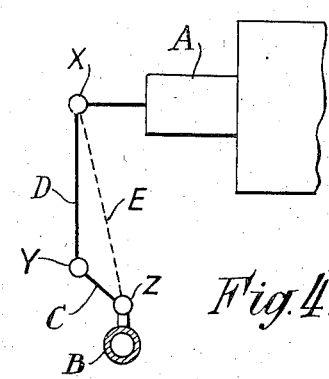
Fig. 4 is a similar diagram for a modified form of the invention.
Figure 5:
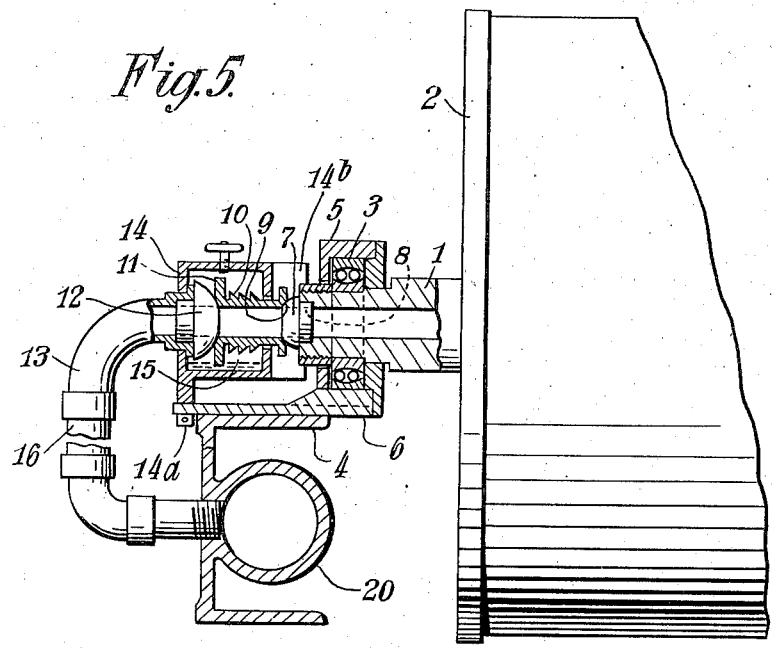
Fig. 5 is a vertical section of one embodiment of the invention, taken on the axial plane of the cylinder.
Figure 6:
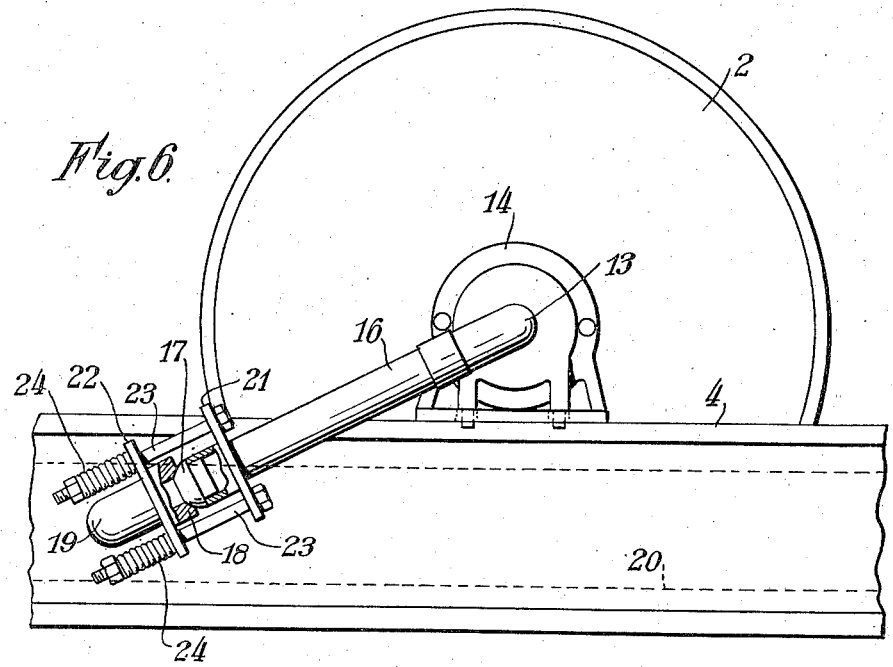
Fig. 6 is an end view of the same.
Figure 7:
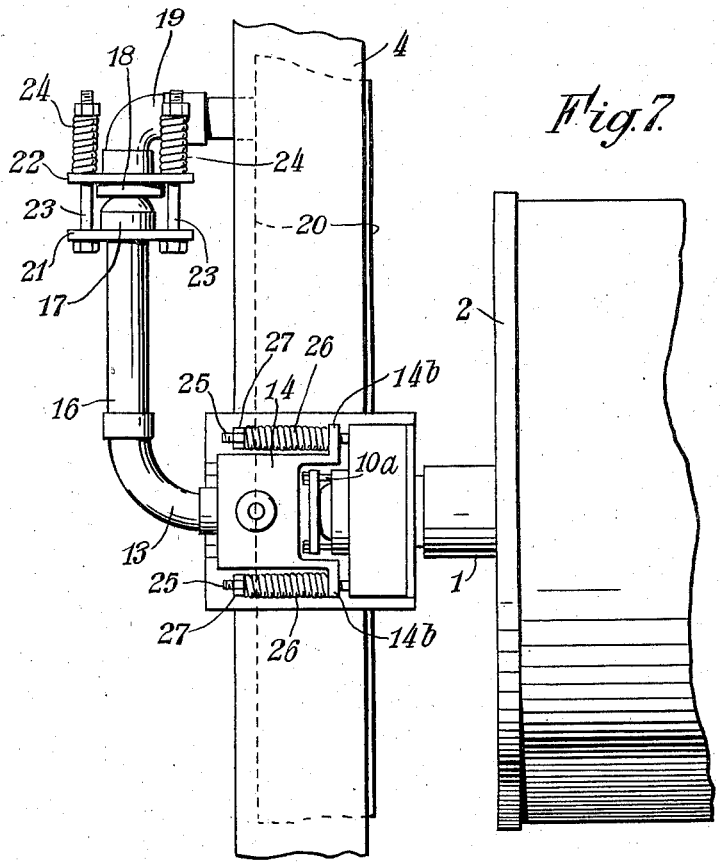
Fig. 7 is a plan.
Figure 8:
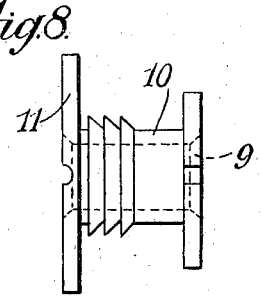
Figs. 8 and 9 are side view and end view of a component hereinafter described in detail.
Figure 9:
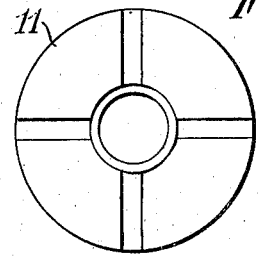

In Fig. 4 the joint Y is placed nearer the joint Z, but the same conditions apply as in the first arrangement, the components C and D together being of greater length than the distance E.

Referring now to Figs. 5 to 9, which show the invention applied to a drying cylinder, the hollow trunnion 1 of the cylinder 2 is supported in an anti-friction (ball or roller) bearing 3, carried by the channel-shaped part 4 of the rigid frame of the machine, the bearing 3 being housed in a casing 5 which is slidable across the channel in a saddle or guide 6 and therefore allows the bearing to move to-and-fro axially. To the outer end of this trunnion 1 is secured a ball-ended member 7 with through opening 8 and there is fitted against such ball-ended member one recessed end 9 of a sleeve or socket 10 whose other end 11, also recessed, fits against a second ball-ended member 12 facing in the opposite direction to the member 7. This second member 12 is secured in the end of an elbow pipe 13 and both ball-shaped parts 7 and 12, with their respective sockets 9 and 11 are ground to fit closely in all relative positions within their range of angular displacement. The sleeve 10 is connected to the trunnion 1 by the bolts 10a so as to rotate therewith. Surrounding the parts 11 and 12 and the major portion of the said sleeve 10, is an enclosing housing 14, the lower part 15 of which constitutes an oil bath. This housing 14 has depending lugs 14a which fit into slots in the said saddle or guide 6 on the main frame, the slots (not shown) being so shaped that the housing 14 may move axially of the cylinder and also transversely of the cylinder. The housing 14 also has laterally extending flanges 14b (see Fig. 7) for a purpose described below.

That part 11 of the said sleeve 10 which fits against the second-named ball-ended part 12 has a disc-shaped flange formed on it so as to dip into the oil in the bath 15 and pick up some of the oil for lubricating purposes, whilst between that flange and the inner wall of the housing 14 are a number of splash rings on the sleeve 10 to throw surplus oil off and thereby prevent its travelling along the sleeve towards the cylinder.

The said elbow pipe 13 which carries the second ball-ended part 12 is mounted in the end wall of the housing 14, and is secured to the upper end of an inclined pipe 16 whose lower end is also fitted with a ball-ended part 17 making joint with a socket member 18 secured fixedly to a further elbow pipe 19 branching from the main steam trunk 20 lying in the channel 4. On the pipe 16 and elbow pipe 19, behind the ball-and-socket members 17, 18 respectively, are cross plates 21, 22 through which pass a pair of bolts 23, and around such bolts, behind one of the cross plates are compression springs 24 acting to keep the ball 17 and socket 18 in contact. The sleeve 10 constitutes one component, and the pipes 13 and 16 constitute the other component of the "branch pipe" referred to in the foregoing definition and in the ensuing claims. A consideration of Figs. 5, 6 and 7 will show that the three ball-and-socket joints lie at the corners of a triangle in the axial plane of pipes 13 and 16.

Projecting outwardly from the casing 5 which surrounds the said anti-friction bearing 3 of the trunnion 1 is a pair of screwed studs 25, passing through the flanges 14b on the oil bath housing 14 and carrying compression springs 26 behind those flanges, which springs react between such flanges and nuts 27 on the ends of the studs 25 to keep the oppositely-directed ball shaped parts 8 and 12 and the intermediate double-socket member 10 in close contact. The whole assembly is free to yield axially as the cylinder 2 expands and contracts, and during such expansion and contraction the ball 17 and socket 18 in the inclined pipe adjust themselves to the consequent displacement of the pipes 13 and 16.

Upon expansion of the pipe 16 itself, which tends to displace the ball-ended part 12 out of line with the part 8, the said sleeve or double-ended socket 10 shifts its direction and maintains close contact with both balls, without interfering with the relative rotation at its outer end. In the result, all the joints are efficiently maintained without any need for resilient packing, and there is no leakage of steam and no dripping of hot water. The ball-and-socket arrangement may be reversed in any or all of the joints.

Other methods of lubricating the sleeve and half-ball may be adopted; for example a drip lubricator may be used, but the self-oiling method is preferred, as requiring the least attention.

What I claim is:

1. The combination with a hollow cylinder journalled in bearings for rotative movement and arranged to receive a fluid heating medium from a source, of a fluid-tight conduit for supplying such medium from the source to the cylinder which allowing for axial expansion of such cylinder, such means comprising a multi-part branch pipe connecting the cylinder with the source, one such part being generally axially aligned with the cylinder axis, a second part being disposed at an angle to such first part and being provided at one end thereof with ball-and-socket means connecting it with said fluid source, and ball-and-socket means at each end of the first part connecting it, respectively, with the cylinder and with the second part.

2. The combination with a hollow cylinder journalled in bearings for rotative movement and arranged to receive a fluid heating medium from a source, of a fluid-tight conduit for supplying such medium from said source to the cylinder while allowing for axial expansion of such cylinder, such means comprising a two-part branch pipe connecting the cylinder with the source, one such part being generally axially aligned with the cylinder axis, a second part being disposed at substantially right angle to such first part and being connected therewith by ball-and-socket means, and ball-and-socket means at each end of the branch pipe connecting it, respectively, with the cylinder and with the fluid source, and spring means urging the ball-and-socket means into fluid-tight relation.

3. The combination with a hollow cylinder journalled in bearings for rotative movement and arranged to receive a fluid heating medium from a source, of a fluid-tight conduit for supplying such medium from such source to the cylinder while allowing for axial expansion of said cylinder, such means comprising a two-part branch pipe connecting the cylinder with the source, one such part being generally axially aligned with the cylinder axis and arranged to rotate with the cylinder, a second part being disposed at an angle to such first part and being provided at one end thereof with ball-and-socket means connecting it with said fluid source, a socket element at each end of the first part and ball means at the adjacent terminals of the cylinder and of the second part cooperating with such socket elements, such ball means having through openings therein communicating with the openings in the socket elements, and spring means urging the ball-and-socket means into fluid-tight relation, whereby axial expansion of the cylinder will produce displacement of the parts of the branch pipe while maintaining the fluid-tight condition of the conduit.

4. The combination with a hollow cylinder journalled in bearings for rotative movement and arranged to receive a fluid heating medium, of a fluid-tight conduit for supplying such medium from a suitable source to the cylinder while allowing for axial expansion of such cylinder, such means comprising a two-part branch pipe connecting the cylinder with the source, one such part being generally axially aligned with the cylinder axis and arranged to rotate with the cylinder, a second part being disposed at an angle to such first part and being provided at one end thereof with ball-and-socket means connecting it with said fluid source, a socket element at each end of the first part and ball means at the adjacent terminals of the cylinder and of the second part cooperating with such socket elements, a housing enclosing the ball-and-socket elements at the outer end of the first part and arranged to receive a lubricant for the elements which rotate relative to each other, and spring means for maintaining the ball-and-socket elements in fluid-tight relation.

ERNEST GORDON.

REFERENCES CITED

The following references are of record in the file of this patent:

UNITED STATES PATENTS

| Number | Name | Date |
| --- | --- | --- |
| 309,457 | Hall | Dec. 16, 1884 |
| 1,382,245 | Russell et al. | June 21, 1921 |
| 1,425,083 | Farrell | Aug. 8, 1922 |
| 1,679,276 | Slining | July 31, 1928 |